3,160,814
ELECTROMAGNETIC ENERGY DETECTOR
Sheldon B. Herskovitz, R.F.D. 1, Acton, Mass.
Filed Apr. 4, 1961, Ser. No. 100,765
15 Claims. (Cl. 325—67)
(Granted under Title 35, U.S. Code (1952), sec. 266)

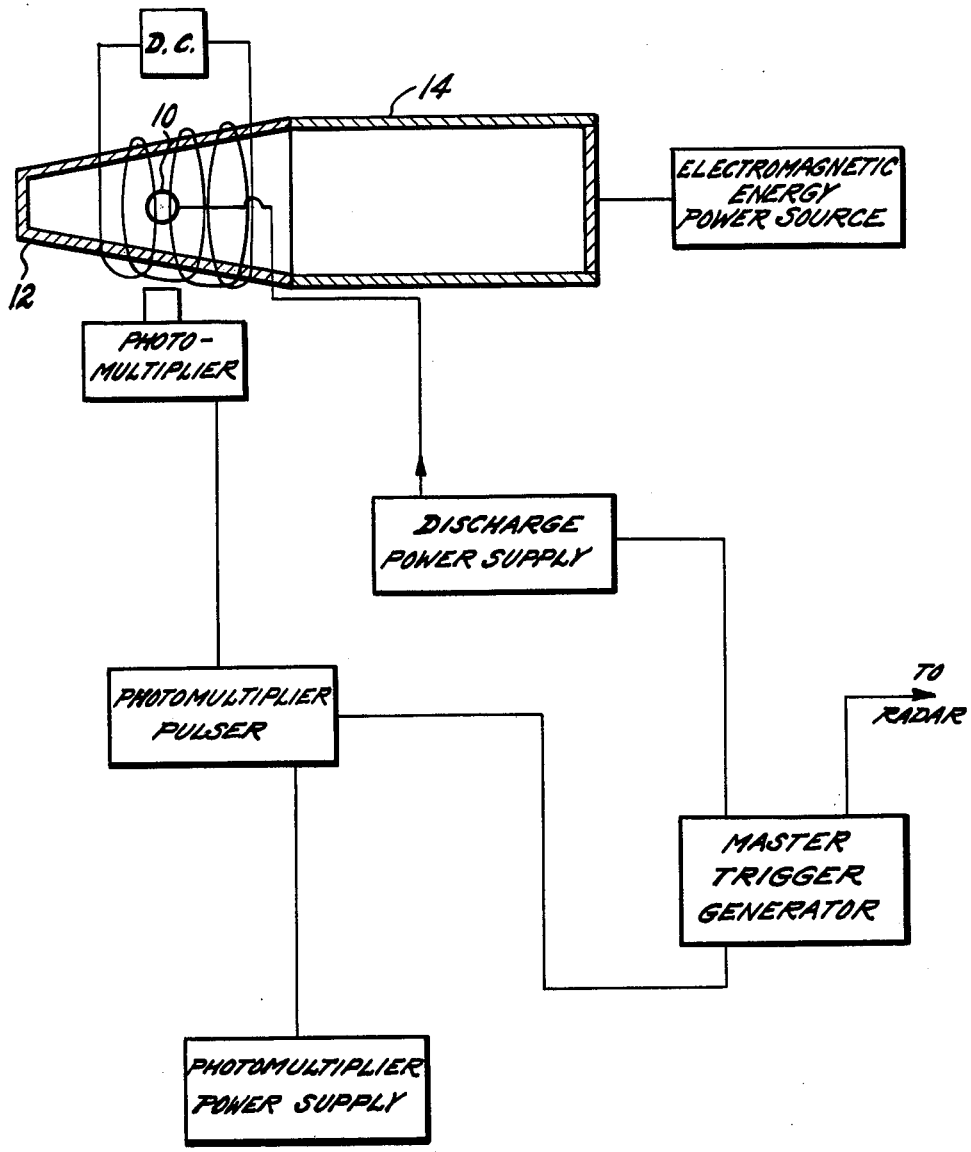

The invention described herein may be manufactured and used by or for the United States Government for governmental purposes without payment to me of any royalty thereon.

This invention relates generally to electromagnetic energy detectors and more particularly one adapted for detection of minute quantities of high frequency electromagnetic energy.

Generally, detection devices for electromagnetic energy utilize the properties of semiconductor crystal diodes; however, these devices are damaged by high incident power levels and give erroneous ratings due to ambient radiation. Semiconductor diodes are also subject to local cluttering and jamming.

Detection devices utilizing gaseous discharges were not heretofore sufficiently sensitive to detect minute amounts of electromagnetic energy.

This invention is based upon the temperature dependence of the electron-ion recombination coefficient in a decaying gaseous discharge. The light output of a decaying gaseous discharge results from the radiation of excess energy from two-body recombination between electrons and ions. The recombination varies with temperature and in general decreases with increasing electron temperature. While the luminosity of the decaying discharge is monitored by a photomultiplier tube, additional electromagnetic energy incident upon the discharge will alter the temperature of the plasma electrons. Therefore, the temperature alteration is transduced to a change of light output which is monitored by the photomultipler. Thus, minute amounts of electromagnetic energy may be detected with extreme accuracy.

Accordingly, it is a primary object of this invention to provide a unique method and apparatus for detecting electromagnetic energy which is capable of measuring minute quantities of electromagnetic energy.

It is another object of this invention to provide an electromagnetic radiation detector which utilizes the recombination rate of an ionized gas.

It is still another object of this invention to provide a novel electromagnetic radiation detector capable of detecting minute amounts of energy which is immune to permanent damage from very high amounts of electromagnetic energy.

It is a further object of this invention to provide an electromagnetic radiation detector which incorporates a passive element which does not require shielding in storage from ambient radiation.

It is a still further object of this invention to provide a passive radiation detector which may be gated as to time of operation to avoid local cluttering and jamming techniques.

Another object of this invention involves the provision of a novel electromagnetic energy detector having an extremely high sensitivity.

Still another object of this invention involves the provision of an electromagnetic detector which permits more effective range gating.

These and other advantages, features and objects of the invention will become more apparent from the following description taken in connection with the illustrative embodiment in the accompanying drawing, wherein the figure is a schematic representation including a block diagram showing the detection system of this invention.

The block diagram portion of the figure represents conventional components which, together with the remainder of the structure of the figure, enable the practice of this invention.

The gaseous discharge required for performance of this invention is produced in a cylindrical container 10 which is filled with a gas. Active, as well as noble gases may be employed; however, noble gases are preferred since high degrees of purity may be obtained and the creation of negative ions by the attachment processes is impossible. Thus, a possible electron loss mechanism is avoided which would reduce the available luminosity. In addition, alteration of the operating pressure due to the "cleaning-up" of gas fill is minimized with the inert gases. Although any of the inert gases may be used, the heavy, rare gases are preferred in order to minimize the energy loss of electrons through elastic collisions. Xenon is a preferred choice because of cost and availability while radon, which is of higher cost and is radioactive, would produce better results. The gas in the container is under pressure in order to minimize electron loss due to diffusion. Although the pressure is not critical, 1–20 mm. Hg is the most common range.

As can be seen from the figure, the gaseous discharge is produced by means of a conventional discharge power supply which applies a discharge voltage pulse to the gas in container 10. The pulse technique is necessary in order to permit the discharge to decay. Either pulsed D.C. or electromagnetic energy of various frequencies may be employed and is coupled to the gas by means of electrodes or standard electrodeless induction techniques. Three thousand volts D.C. were used; however, the main pulse of a radar system may prove to be most convenient.

The gaseous discharge is followed by a decaying afterglow resulting from the two-body recombination of electrons with positive ions from the gas. The gas container, therefore, is of a material which presents a low dielectric loss to the electromagnetic energy to be detected and also permits viewing of the luminous output. For this purpose, glass or quartz containers of any configuration which minimizes electron collisions with the walls are applicable.

The electromagnetic energy to be detected may be the reflected energy from a radar target and is used to supply the energy for the quenching of the recombination rate. The coupling of this energy may be achieved in many ways, for example, by the insertion of the gas container 10 in a waveguide structure 12 which is shown in the figure as a tapered waveguide. The container 10 is inserted in either the E-plane, H-plane or diagonal walls of the waveguide.

Alternative arrangements (not shown) allow for the insertion of the container 10 in a resonant circuit such as a cavity, tank circuit or other impedance or frequency matching structure. The gas container 10 may be enclosed, or may itself enclose, an appropriate slow wave structure such as a helix, and thereby interact with the electromagnetic energy. Alternatively, the container 10 may stand in free space and be irradiated by electromagnetic energy from a horn, antenna or other propagation device. The only requirement is that the energy to be detected must be coupled to the gas container.

The discharge power supply is connected with a master trigger generator in order that the discharge pulses applied to the container 10 may be controlled for anti-jamming. The master trigger generator may also be connected to a radar set in order to synchronize the action of the radar with the activation of the detector. It should be understood that the discharge power supply may be taken directly from the main radar.

A photomultiplier is utilized to monitor the decay rate by monitoring the luminosity of the afterglow of the ionized gas. The photomultiplier is activated only during the period during which detection is desired since its sensitivity is increased and fatiguing is avoided by an intermittent use thereof. A photomultplier pulser acts as a switch to control the operation of the photomultiplier, and this, in turn, is connected to the photomultiplier power supply and also to the master trigger generator for synchronization with the remainder of the device. In order to avoid reflections a uniline waveguide structure 14 is connected with the tapered waveguide 12.

The detector receives energy to change the recombination rate by alternating the temperature of the plasma electrons from an electromagnetic power source which couples the energy through the uniline section 14 to the tapered waveguide section 12. This power source may be an antenna which receives the reflected signal energy from a radar system.

Thus, the luminosity output versus time, after application of an initiating energy pulse from the discharge power supply to the gas bottle 10, is monitored by the photosensitive detector which is a photomultiplier, as shown in the figure, but may also be a phototube or any other light sensitive device of suitable sensitivity. The monitoring may, if desired, be visually displayed by means of an oscilloscope trace by utilizing standard techniques. When an oscilloscope is used, the traces may be arranged such that the standard decay rate may be presented alternately with the altered decay rate. The alteration of the decay rate is achieved by the presentation of energy from the electromagnetic power source to the gas in container 10 after it has been activated by the discharge power supply.

The alteration of light output may be enhanced in several ways. These techniques may be generally described as methods of influencing electron behavior to a greater degree for a fixed amount of incident electromagnetic energy. This may be achieved by the employment of a magnetic field of suitable magnitude which is adjusted to alter the electrons random path into an elongated helix or spiral. Most enhancement of light output or alteration occurs when the electron cyclotron frequency is reached.

A permanent magnet or electromagnet, as shown, may be utilized for the application of the magnetic field and its orientation should be such as to have the magnetic field perpendicular to the E vector of the electromagnetic field. The enhancement of the light output of the magnetic field technique increases the sensitivity while at the same time decreases the bandwidth. Thus, the device becomes frequency sensitive such that optimum response is achieved for a specific frequency.

The embodiment of the figure actually has a built-in enhancement feature since the tapered waveguide, by concentrating the E field, tends to cause a greater influence of the electron energy for a fixed amount of incident electromagnetic energy over that achieved in standard, rectangular waveguides.

Although the invention has been described with reference to a particular embodiment, it will be understood to those skilled in the art that the invention is capable of a variety of alternative embodiments within the spirit and scope of the appended claims.

What is claimed is:

1. A method for detecting electromagnetic energy comprising the steps of ionizing a gas with a pulse of energy to render it luminescent, allowing the luminescence to decay, and adding electromagnetic energy to said gas during the decay of the luminescence of said gas, in order to compare the decay rate of said gas when no added energy is applied to the decay rate when added energy is applied.

2. A method for detecting electromagnetic energy comprising the steps of supplying a source of energy to a gas to cause ionization thereof thereby rendering it luminescent, removing the energy source for ionization, allowing the luminescence to decay, and adding electromagnetic energy to be detected to said gas to change the electron temperature of the plasma electrons prior to the end of the decay of the luminescence of said gas, said change of temperature effecting a change in luminosity of said gas which reflects the amount of additional energy added.

3. A method for detecting electromagnetic energy comprising the steps of applying energy to a gas to cause ionization and luminescence thereof, removing said source of energy, and applying electromagnetic energy to be detected to said gas prior to the complete decay of said luminescence of said gas to vary the electron-ion recombination coefficient of said ionized gas by varying the temperature of the plasma electrons.

4. A method for detecting minute quantities of electromagnetic energy comprising the steps of applying energy to a gas to cause ionization and luminescence thereof, removing said energy from said gas to allow electron-ion recombination in the decaying discharge, coupling electromagnetic energy to be detected to said gas to vary the luminosity of said decaying discharge, and monitoring said luminosity to determine the amount of said additional energy.

5. A method as defined in claim 4 including the step of influencing the electron behavior to render it susceptible to the electromagnetic energy to a greater degree for a fixed amount of said electromagnetic energy.

6. An electromagnetic energy detector comprising a container of ionizable gas, means for coupling energy to said gas to cause ionization and luminescence thereof, means to shut off said coupled energy to allow the luminescence to decay while still providing a light output due to the radiation of excess energy from the recombination of the electrons and ions of said gas, means for coupling electromagnetic energy to be detected to said decaying discharge to vary the temperature of the plasma energy, and means for monitoring said change of temperature.

7. An electromagnetic energy detector comprising a container of ionizable gas, means for coupling a pulse of energy to said gas to cause ionization and luminescence thereof, means to couple electromagnetic energy to be detected to said gas during the recombination period of said gas, and means to monitor the change in the rate of luminescence decay due to the addition of said energy to be detected over the normal recombination rate.

8. A detector as defined in claim 7 wherein said last-mentioned means comprises a photomultiplier tube.

9. A detector as defined in claim 7 including means for timing the operation of said means for coupling electromagnetic pulse energy to be detected and said means to monitor.

10. A plasma electromagnetic energy detector comprising a container of gas, means for applying a pulse of energy to cause a discharge in said gas, means for supplying electromagnetic energy to be detected to said gas during the decay of said gaseous discharge, said decay of said gaseous discharge producing a light output due to the radiation of excess energy from two-body recombination between electrons and ions of said gas, and means to compare the rate of decay of said light output, when said electromagnetic energy to be detected has been supplied, with the normal decay rate of said gaseous discharge.

11. A method for detecting minute quantities of electromagnetic energy comprising the steps of applying energy to a gas to cause ionization and luminescence thereof, removing said energy from said gas to allow electron-ion recombination in the decaying discharge, coupling electromagnetic energy to be detected to said gas to vary the luminosity of said decaying discharge, monitoring said luminosity to determine the amount of said additional energy, and influencing the electron behavior to render it susceptible to the electromagnetic energy to a greater degree for a fixed amount of said electromagnetic energy, said influencing altering the electron random path into an elongated helix.

12. A method for detecting minute quantities of electromagnetic energy comprising the steps of applying energy to a gas to cause ionization and luminescence thereof, removing said energy from said gas to allow electron-ion recombination in the decaying discharge, coupling electromagnetic energy to be detected to said gas to vary the luminosity of said decaying discharge, monitoring said luminosity to determine the amount of said additional energy, and influencing the electron behavior to render it susceptible to the electromagnetic energy to a greater degree for a fixed amount of said electromagnetic energy, said influencing being performed by the application of a magnetic field to said gas.

13. An electromagnetic energy detector comprising a container of ionizable gas, means for coupling a pulse of energy to said gas to cause ionization and luminescence thereof, means to couple electromagnetic energy to be detected to said gas during the recombination period of said gas, means to monitor the change in the rate of luminescence decay due to the addition of said energy to be detected over the normal recombination rate, and means for altering the electron random path during recombination into a spiral.

14. An electromagnetic energy detector comprising a container of ionizable gas, means for coupling a pulse of energy to said gas to cause ionization and luminescence thereof, means to couple electromagnetic energy to be detected to said gas during the recombination period of said gas, means to monitor the change in the rate of luminescence decay due to the addition of said energy to be detected over the normal recombination rate, and means including an electromagnetic field for altering the electron random path during recombination into a spiral.

15. A plasma electromagnetic energy detector comprising a container of gas, means for applying a pulse of energy to cause a discharge in said gas, means for supplying electromagnetic energy to be detected to said gas during the decay of said gaseous discharge, said decay of said gaseous discharge producing a light output due to the radiation of excess energy from two-body recombination between electrons and ions of said gas, means to compare the rate of decay of said light output, when said electromagnetic energy to be detected has been supplied, with the normal decay rate of said gaseous discharge, and means acting on said gas for altering the random path of said electrons into an elongated helix.

References Cited by the Examiner
UNITED STATES PATENTS

| | | | |
|---|---|---|---|
| 2,395,850 | 3/46 | Colman | 325—364 |
| 2,405,814 | 8/46 | Brannin | 243—17.7 |
| 2,689,918 | 9/54 | Youmans | 250—83.6 |
| 2,711,530 | 6/55 | Rines | 250—71 |
| 2,928,937 | 3/60 | Harman | 250—71 |

ARTHUR GAUSS, *Examiner.*

DAVID G. REDINBAUGH, *Primary Examiner.*